United States Patent [19]

Takagi et al.

[11] Patent Number: 5,752,316
[45] Date of Patent: May 19, 1998

[54] ORIFICE PLATE FOR INJECTOR AND METHOD OF MANUFACTURING THE SAME

[75] Inventors: Takaaki Takagi; Kaneo Imamura, both of Obu; Katuo Yoshihara, Chiryu; Akihiro Tanaka, Tanashi, all of Japan

[73] Assignees: Aisan Kogyo Kabushiki Kaisha, Obu; Miyama Seiko Kabushiki Kaisha, Chiryu; Citizen Tokei Kabushiki Kaisha, Tokyo-to, all of Japan

[21] Appl. No.: 606,959

[22] Filed: Feb. 26, 1996

[30] Foreign Application Priority Data

Feb. 27, 1995 [JP] Japan .................................. 7-038157

[51] Int. Cl.⁶ .................................................. B23P 15/16
[52] U.S. Cl. ................................. 29/888.4; 29/890.128; 29/890.13
[58] Field of Search ................. 29/888.4, 890.142, 29/890.13, 890.128; 239/533.12, 533.14

[56] References Cited

U.S. PATENT DOCUMENTS

| | | | |
|---|---|---|---|
| 4,069,978 | 1/1978 | El Moussa | 29/890.128 |
| 4,519,370 | 5/1985 | Iwata | 239/533.12 |
| 4,903,898 | 2/1990 | Kind | 239/533.12 |
| 5,092,039 | 3/1992 | Gaskell | 239/533.12 |

FOREIGN PATENT DOCUMENTS

| | | | |
|---|---|---|---|
| 4-89853 | 8/1992 | Japan . | |
| 5-164019 | 6/1993 | Japan | 29/890.143 |
| 667463 | 3/1952 | United Kingdom | 239/533.12 |

*Primary Examiner*—Erick R. Solis
*Attorney, Agent, or Firm*—Dennison, Meserole, Pollack & Scheiner

[57] ABSTRACT

An orifice plate to be mounted at a fuel jet section of an injector has a plurality of jet holes formed therethrough for injecting fuel. The orifice plate includes a curved surface formed at an inlet peripheral edge of each of the jet holes, and a cylindrical projection formed at an outlet of each of the jet holes. The cylindrical projection has the same inner diameter as that of the jet hole.

1 Claim, 9 Drawing Sheets

RELATION BETWEEN JET HOLE EFFECTIVE LENGTH
AND FUEL JET CONDITION

RELATION BETWEEN JET HOLE EFFECTIVE LENGTH
AND FUEL JET CONDITION

ORIFICE PLATE FOR INJECTOR AND METHOD OF MANUFACTURING THE SAME

BACKGROUND OF THE INVENTION

1. Field of the Invention

This invention relates to an orifice plate for an injector in an internal combustion engine which is simple in construction and which can improve fuel injection characteristics of the injector. The invention is also concerned with a method of manufacturing such an orifice plate.

2. Description of the Prior Art

As shown in FIG. 5, a type of injectors is provided with an orifice plate 33 at a jet section 35 so as to form a desirable shape of a fuel jet flow when fuel is supplied to an engine. The orifice plate 33 of a thickness of t is provided therethrough with a plurality of jet holes 51 positioned directly below a valve head 29. The jet holes 51 each having an inner diameter $\phi d$ are provided such that the distance therebetween expands downward and are inclined at a predetermined machining angle $\theta 0$ to each other. The jet holes 51 thus provided with the machining angle $\theta 0$ therebetween can control a fuel jet flow A from an injector 1 to be formed into a desirable shape (See FIG. 8). The total cross-sectional area of the jet holes 51 is designed to be minimum in the whole fuel passage, so that fuel flow rate per unit time is determined by the total cross-sectional area of the jet holes 51. When the valve head 29 is opened, the area of a gap defined between a valve seat and the valve head 29 is larger than the total area of the jet holes 51 and therefore does not control the fuel flow rate per unit time. In the vicinity of the orifice plate 33, burble and contraction of the fuel flow are readily generated, since the velocity and direction of the fuel flow rapidly change. As a result, vacuum evaporation or vaporization of the fuel tends to be brought about in the vicinity of the orifice plate 33, particularly when the fuel temperature is high.

When the fuel is vaporized in the vicinity of the orifice plate 33, fuel vapor passes through the jet holes 51 for controlling the fuel flow rate, thus reducing an actual fuel supply amount. Therefore, there has been a problem that the air-fuel ratio of the fuel to be supplied to the engine through the injector becomes lean when the fuel is at high temperatures, thus deteriorating the restartability of the engine.

A prior art for solving the above problem is disclosed in Japanese Laid-Open Utility Model Publication No. 4-89853. In this art, as shown in FIG. 6, each jet hole 51 of an injector is formed at an inlet thereof with a circular curved surface 54 to permit a fuel flow to smoothly enter the jet hole 51, thereby preventing an occurrence of the phenomenon such as burble and contraction of the fuel flow and vacuum evaporation of the fuel. Specifically, a radius of curvature R of the curved surface 54 is set to be 0.1 mm or longer when a inner diameter "$\phi d$" of each jet hole 51 is 0.17 to 0.21 mm.

The curved surface 54 thus constructed prevents fuel vaporization and stabilizes the air-fuel ratio of the fuel to be supplied to the engine as well. FIG. 7 shows the relation between a value R/$\phi d$ representing the radius of curvature R divided by the inner diameter $\phi d$ and the air-fuel ratio changing rate. The air-fuel ratio changing rate is measured by dividing the air-fuel ratio in a condition that the fuel is at high temperatures by the air-fuel ratio in a condition that the fuel is at low temperatures. Here, as the R/$\phi d$ becomes larger, the chamfering arc becomes smoother, and as the air-fuel ratio changing rate becomes larger, the air-fuel ratio at high temperatures becomes leaner. As shown in FIG. 7, the larger the radius of curvature R becomes, the nearer the air-fuel ratio changing rate approaches to a value 1, thus permitting stabilization of the air-fuel ratio. As the changing rate approaches to the value 1, the air-fuel ratio at high temperatures comes close to the air-fuel ratio at low temperatures.

However, in the conventional orifice plate described above, as shown in FIG. 6, the effective length L1 of each jet hole 51 is shortened by R, which is the radius of curvature of the curved surface 54, compared with a total axial length L0 of the jet hole 51.

Referring to FIG. 8, the fuel jet A from the injector 1 includes a main jet B and a diffusing jet C around the main jet B.

FIG. 9 shows the relation between a ratio L1/$\phi d$ of the effective length L1 of the jet hole 51 to the inner diameter $\phi d$ thereof and a ratio $\theta 1/\theta 0$ of a jet angle $\theta 1$ of the main jet B to a machining angle $\theta 0$ between the jet holes 51.

As the effective length L1 becomes shorter with respect to the jet inner diameter $\theta d$, $\theta 1/\theta 0$ decreases. The shorter effective length L1 enlarges a disconformity of the jet angle $\theta 1$ of the main jet B with the machining $\theta 0$.

FIG. 10 shows the relation between the ratio L1/$\theta d$ to $\theta 2-\theta 1$ representing a difference between the jet angle $\theta 2$ of the diffusing jet C and the jet angle $\theta 1$ of the main jet B.

As the effective length L1 becomes shorter with respect to the jet hole inner diameter $\theta 1$ the value of $\theta 2-\theta 1$ k increases. The short effective length L1 of the jet hole 51 expands the diffusing jet C. The expansion of the diffusing jet C tends to raise a problem of deteriorating combustion efficiency due to, for example, fuel adhesion to an internal wall of an intake manifold.

As should be apparent from the foregoing description, it is advantageous to enlarge the radius of curvature R to stabilize the air-fuel ratio, while as the larger the radius becomes, the shorter the effective length L1 becomes, thus making it difficult to obtain a desirable shape of the fuel jet flow.

One measure to solve the above described problem is to increase the thickness t of the orifice plate 33 so that the necessary radius of curvature R and the effective length L1 of the jet hole 51 can be ensured. However, such an orifice plate is generally made by low-cost press working so that the hole-boring work for the jet holes 51 becomes difficult, when the plate is thickened.

SUMMARY OF THE INVENTION

It is, accordingly, an object of the present invention to provide an orifice plate which is simple in construction and which is capable of accurately injecting fuel, by improving a jet hole construction without increasing the entire thickness of the orifice plate.

It is another object of the present invention to provide an injector having such an orifice plate, and a method of manufacturing the orifice plate.

In order to achieve the above object, the present invention provides the following aspects.

According to a first aspect of the invention, there is provided an orifice plate to be mounted at a fuel jet section of an injector and having a plurality of jet holes formed therethrough for injecting fuel, comprising a curved surface formed at an inlet peripheral edge of each of the jet holes and a cylindrical projection formed at an outlet of each of the jet holes and having the same inner diameter as that of the jet hole.

3

According to the first aspect, when the orifice plate is mounted at the fuel jet section of the injector, a rapid change in flow velocity and direction is moderated by the curved surface formed at the inlet peripheral edge of the orifice plate, thus preventing flow burble and contradiction from occurring. Further, a sufficient effective length is ensured by the cylindrical projection formed at the outlet of each jet hole and having the same inner diameter as that of the jet hole.

In a second aspect, there is provided an orifice plate to be mounted at a fuel jet section of an injector and having a plurality of jet holes formed therethrough for injecting fuel, comprising a chamfered surface formed at an inlet peripheral edge of each of the jet holes and a cylindrical projection formed at an outlet of each of the jet holes and having the same inner diameter as that of the jet hole.

Preferably, the cylindrical projection is projected outwardly by a length of two-hundredths the inner diameter of the jet hole or more. With this construction, a projected length of the cylindrical projection is specified such that it is long enough to ensure, at least, a minimum effective length of the jet hole, thereby providing a practical orifice in view of a jet fuel directivity.

In this invention, the orifice plate is manufactured by the following steps: boring a plate material by burring to provide holes which serve as the jet holes, forming a curved surface at an inlet peripheral edge of each of the jet holes at the same time of the boring, and forming a projection at an outlet of each of the jet holes in its burring direction.

By this method, the curved surface at the inlet and the projection at the outlet are formed by a single operation from the plate material. A sufficient radius R and a sufficient effective length L1 can be obtained from a thin plate material.

The present invention will be more fully understood from the following detailed description and appended claims when taken with the accompanying drawings.

4

DETAILED DESCRIPTION OF THE PREFERRED EMBODIMENTS

Figure 1:
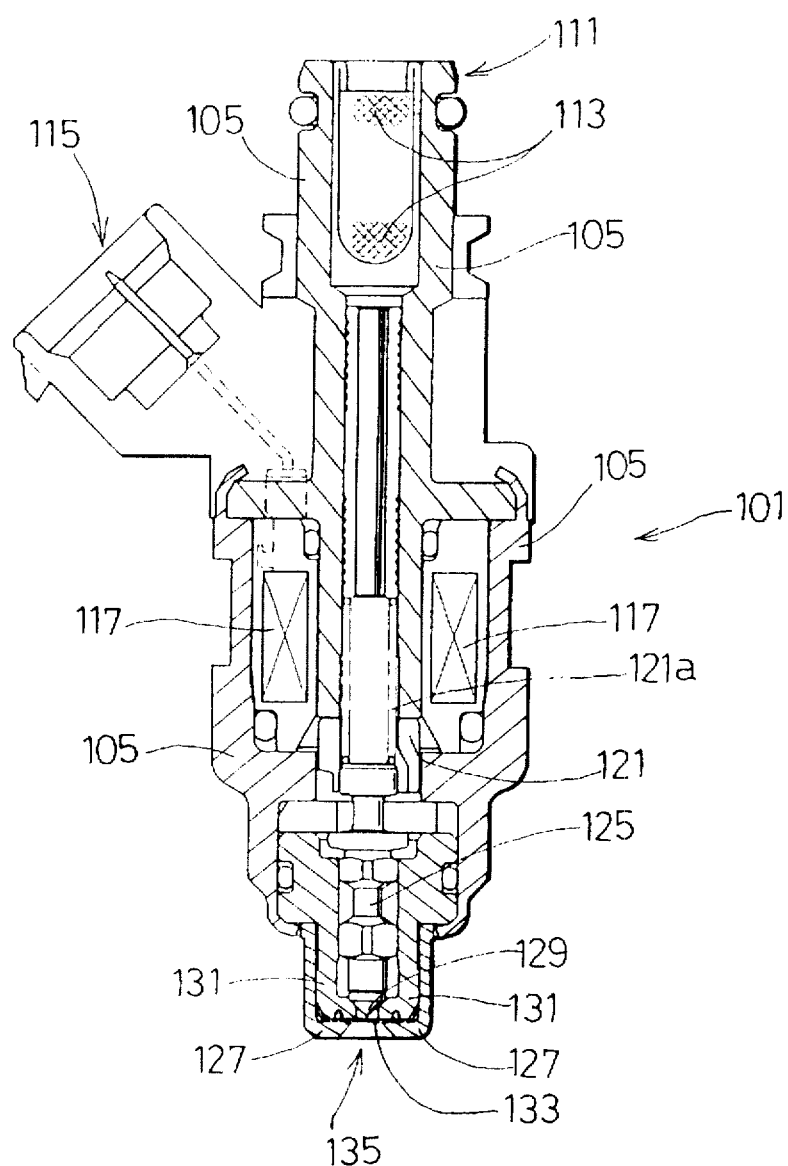
FIG. 1 is a sectional view illustrating the overall construction of an injector according to a preferred embodiment of the present invention.

Referring now to the drawings, an injector 101 according to a preferred embodiment of the present invention will be described.

The overall construction of the injector 101 is shown in FIG. 1. The injector 101 comprises a housing 105 and an electric connector 115. The housing 105 includes a fuel connector 111 having a filter 113 mounted therein, a solenoid coil 117 to be energized by the electric connector 115, an armature 121 vertically movable by the solenoid coil 117, a needle valve 125 integrally assembled with the armature 121, a valve head 129 disposed at an end of the needle valve 125, a valve seat 131 for covering an outer periphery of the needle valve 125 and the valve head 129, a cap 127 disposed at one end of the housing 105 for covering the valve sheet 131, and an orifice plate 133 defined at a jet section 135 for injecting fuel.

The fuel connector 111 with the filter 113 therein is connected to a delivery pipe (not shown). The fuel is supplied from the delivery pipe to the injector 101.

The electrical connector 115 is electrically connected to an ECU (Electronic Control Unit) (not shown) to actuate the solenoid coil 117. The solenoid coil 117 drives the armature 121 in the vertical direction based on a signal from the electrical connector 115. The needle valve 125 is integrally assembled with the armature 121 with the valve head 129 disposed at the end thereof. Therefore, as the armature 121 vertically moves, the needle valve 125 and the valve head 129 are vertically moved. The outer periphery of both the needle valve 125 and the valve head 129 is covered with the valve seat 131 with a clearance defined therebetween. The fuel is introduced to the fuel jet section 135 through the clearance. Further, the armature 121 and the valve head 129 are biased by a spring 121a. Therefore, the valve head 129 is in direct contact with the valve seat 131, while the solenoid coil 117 is not energized.

The orifice plate 133 is provided on the bottom surface of the valve seat 131, and the jet section 135 of a nozzle configuration is formed through the bottom surface of the cap 127 to be positioned below the valve head 129.

Figure 2:
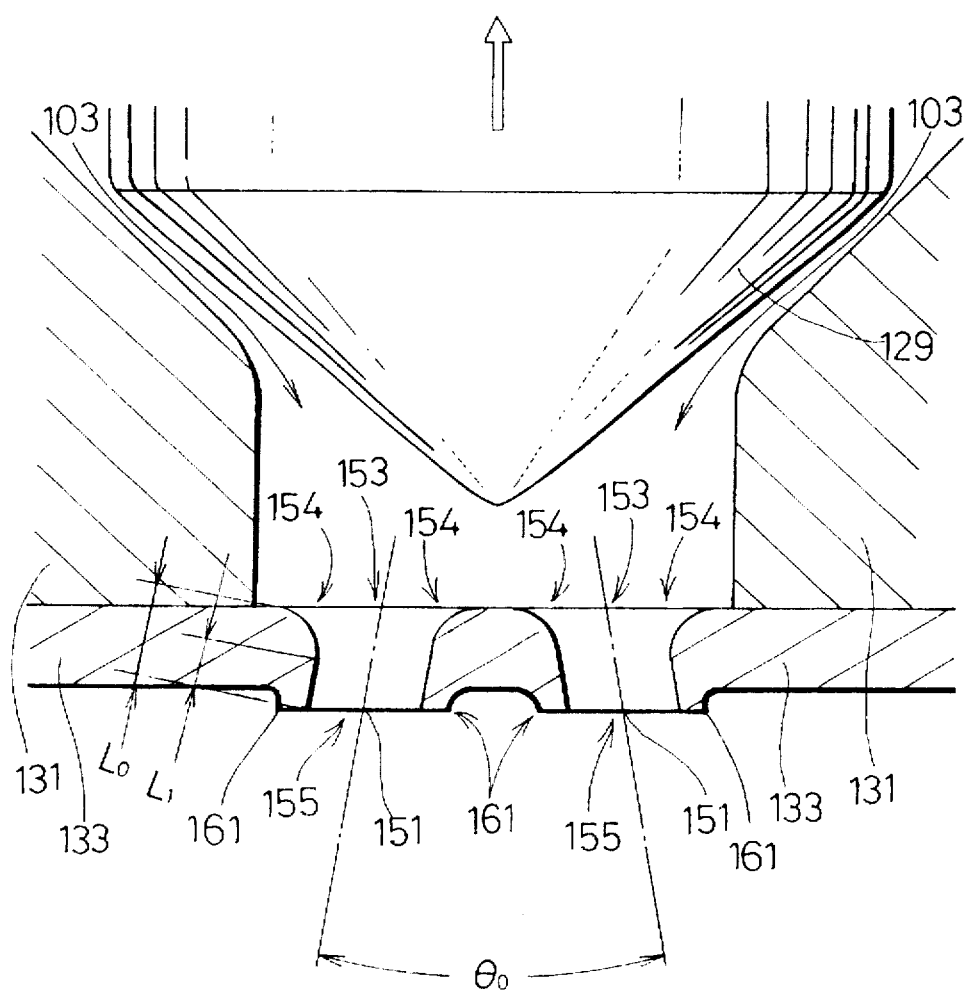
FIG. 2 is an enlarged sectional view illustrating the peripheral construction of an orifice plate of the injector shown in FIG. 1.

Referring now to FIG. 1, the construction of the orifice plate 133 which shows the technical feature of the present invention will be described. FIG. 2 is an enlarged sectional view illustrating the construction of the valve head 129 and the orifice plate 133 of the injector 101 of FIG. 1. The orifice plate 133 is fixed to the bottom surface of the valve seat 131, and has a plurality of jet holes 151 provided therethrough to be positioned directly below the valve head 129. Two of such jet holes are exemplarily shown in FIG. 2.

Figure 8:
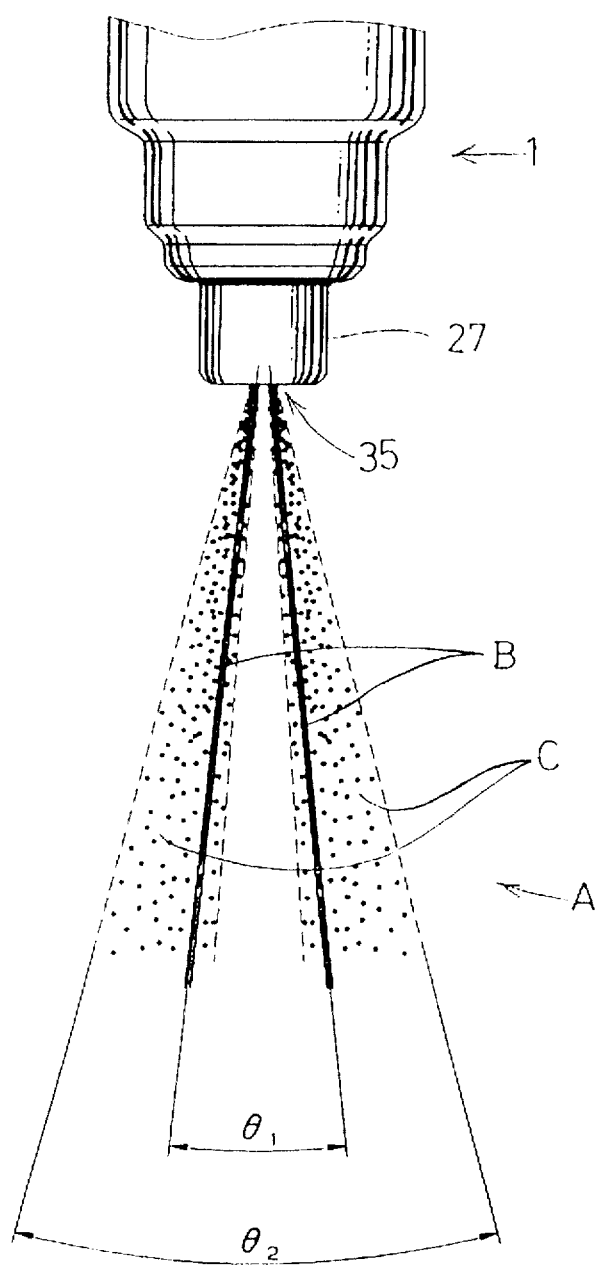
FIG. 8 is a front view of a fuel jet condition.
Figure 9:
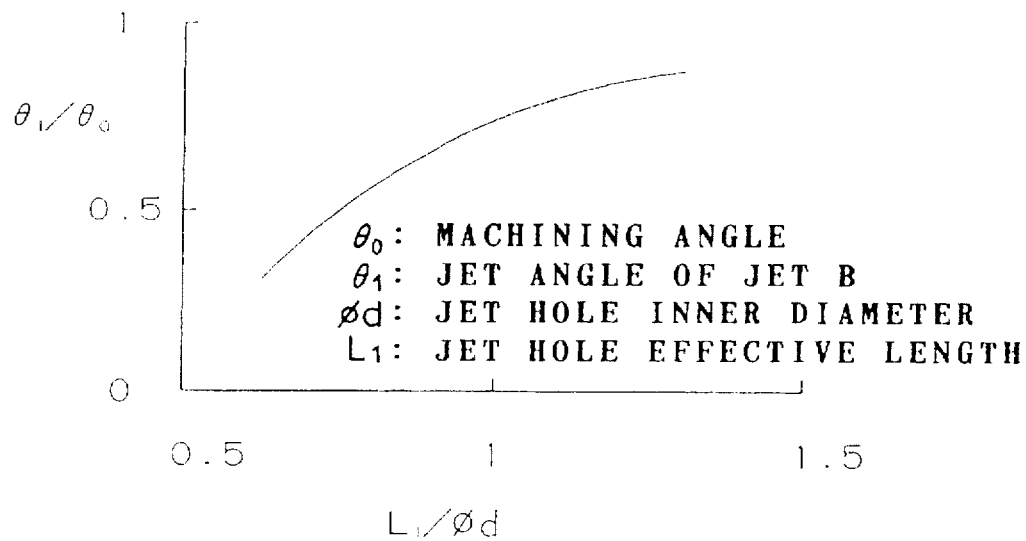
FIGS. 9 and 10 are graphs illustrating the relation between the effective length of the jet hole and the fuel jet condition.

It should be noted that a plurality of jet holes 151 are provided to intersect at a predetermined machining angle θ0 to each other so as to obtain a desirable shape of the fuel jet flow (see FIG. 8).

In each jet hole 151, the jet hole inlet 153 has a peripheral edge formed into a circular curved surface 154. Specifically, the circular curved surface 154 is rounded so that fuel 103 having flown through a clearance between the valve head 129 and the valve seat 131 can be smoothly introduced into the jet hole 151. As will be described hereinafter, this design is served to prevent the fuel 103 flown through the valve head 129 from rapidly changing in flow velocity and direction so that the fuel 103 is introduced as smoothly as possible.

The circular curved surface 154 at the peripheral edge of the jet hole inlet 153 can be replaced by, for example, a chamfered configuration which can prevent a rapid change in flow velocity and direction of the fuel 103 at the inlet of the jet hole 151, and which can smoothly introduce the fuel 103 into the jet holes 151.

Alternatively, the peripheral edge of the jet hole inlet 153 may be constructed by a combination of the circular curved surface and the chamfered portion.

The jet hole 151 includes a jet hole outlet 155 provided with a projection 161. Each projection 161 is formed into a cylindrical shape having the same inner diameter as that of the jet hole 151.

The jet hole 151 is so constructed that the effective length L1 thereof becomes longer than that of the jet hole having no projection.

In view of the directivity of the fuel 103 when injected, a minimum projection length sufficient to ensure the effective length L1 of the jet hole 151 is, preferably, two-hundredths the inner diameter $\phi d$ of the jet hole 151 or longer. Specifically, the dimension of the projection 161 in the projected direction is determined such that the effective length L1 of the jet hole 151 becomes longer by at least two-hundredths the inner diameter $\phi d$ of the jet hole 151.

Thus, the projection identifies the minimum effective length L1 of the jet hole 151 required to stabilize the directivity of the fuel injection.

The operation of the injector 101 of the embodiment will be described.

After the fuel in a fuel tank is pumped and raised in pressure, it is fed to the fuel connector 111 of the injector 101 (see FIG. 1) through a fuel pipe and a delivery pipe (not shown in particular). After foreign matters are removed by the filter 113 mounted in the fuel connector 111, the fuel flows in the injector. As mentioned before, the valve head 129 provided at the lower end of the needle valve 125 is in close contact with the valve seat 131 while the coil 117 is not energized, so that the fuel is kept staying in the injector 101. On the other hand, when the solenoid coil 117 is energized, the armature 121 is moved upward against the biasing force of the spring 121a. With the upward movement of the armature 121, the valve head 129 is also moved upward and is separated from the valve seat 131.

As the valve head 129 is moved upward, the fuel 103 is allowed to flow downward (as viewed in FIG. 2) from a clearance between the valve head 129 and the valve seat 131. Then, the fuel 103 passes through the jet holes 151 of the orifice plate 133 and is injected from the jet section 135 of the cap 127, while the injected fuel flow is formed into a predetermined shape, as shown in FIG. 8.

As shown in FIG. 2, rapid change in flow velocity and direction of the fuel 103 is prevented by the circular curved surface 154, so that the fuel 103 can smoothly enter the jet hole 151. Therefore, the fuel 103 produces no burble and contradiction and is smoothly injected, thus stabilizing the air-fuel ratio of the fuel to be supplied to the engine.

With this construction, even when the fuel temperature is high, fuel vaporization will not be caused readily, thus preventing fuel leanness, and thus making it possible to obtain almost the same air-fuel ratio as that in restart of the engine at a normal temperature.

Further, the projection 161 formed at the jet hole outlet 155 practically increases the effective length L1 of the jet hole 151, so that the jet angle $\theta 1$ of the main jet B and the machining angle $\theta 0$ of jet holes 151 are directed to accord with each other, thus permitting formation of an accurate main fuel jet B corresponding to the machining angle $\theta 0$ of the jet holes 151.

Further, by the increase of the effective length L1 of the jet holes 151, diffusion of the diffusing jet C against the main fuel jet B can be suppressed, thus permitting an accurate shape of the fuel jet.

Figure 10:
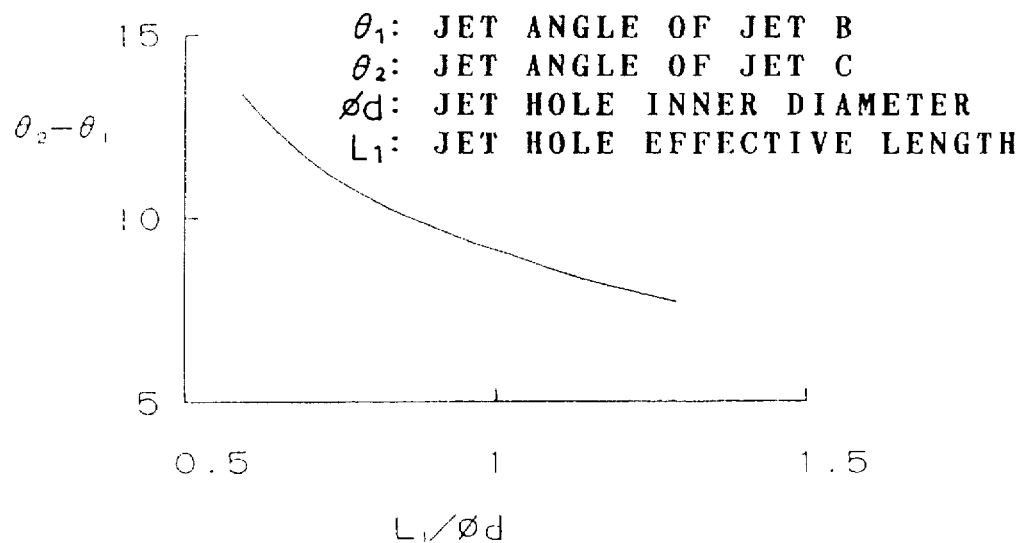

Specifically, as shown in FIG. 10, when the effective length L1 of the jet hole 151 becomes larger with respect to the inner diameter $\phi d$ thereof (L1/$\phi d$ increasing direction), the value of $\theta 2$-$\theta 1$ decreases. This means that an expansion of the jet angle $\theta 2$ of the diffusing jet C against the jet angle $\theta 1$ of the main jet B can be suppressed.

Figure 3:
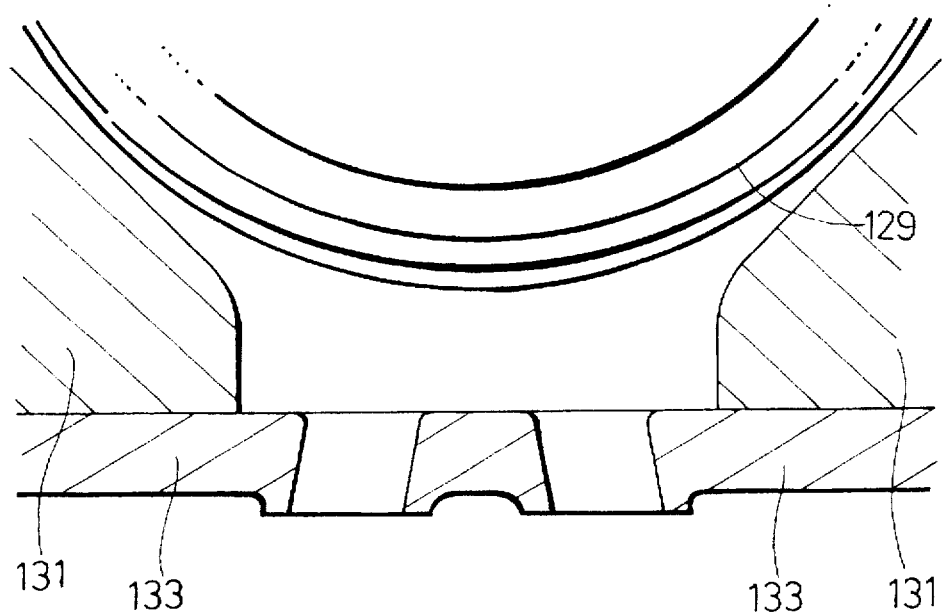
FIG. 3 is a view similar to FIG. 2 illustrating a modification to the embodiment of FIG. 1.
Figure 4:
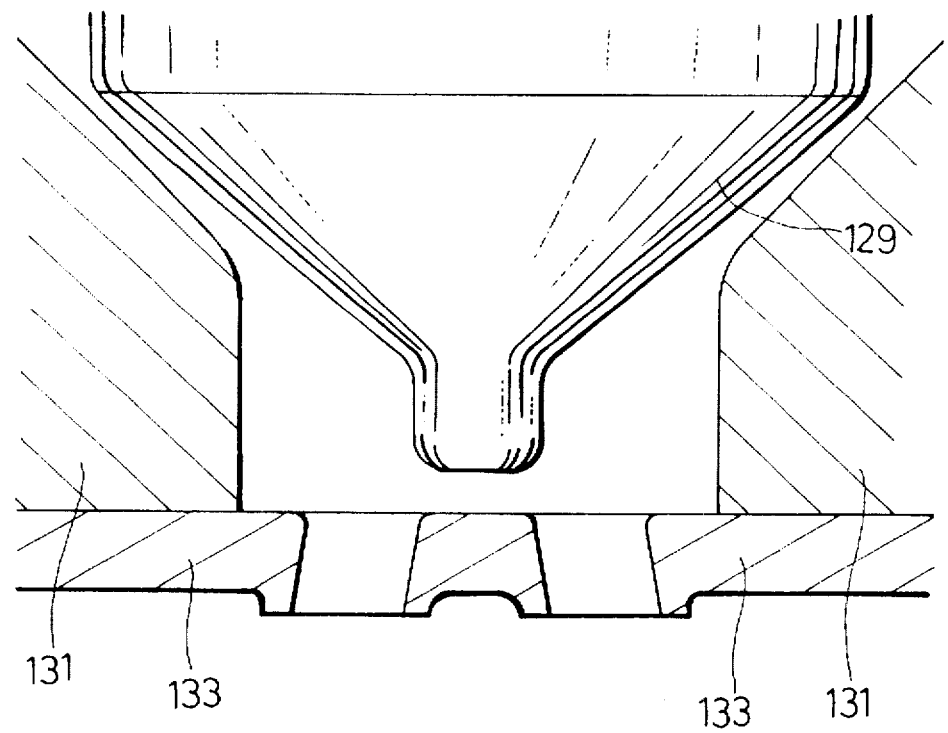
FIG. 4 is a view similar to FIG. 2 illustrating another modification of the embodiment of FIG. 1.
Figure 5:
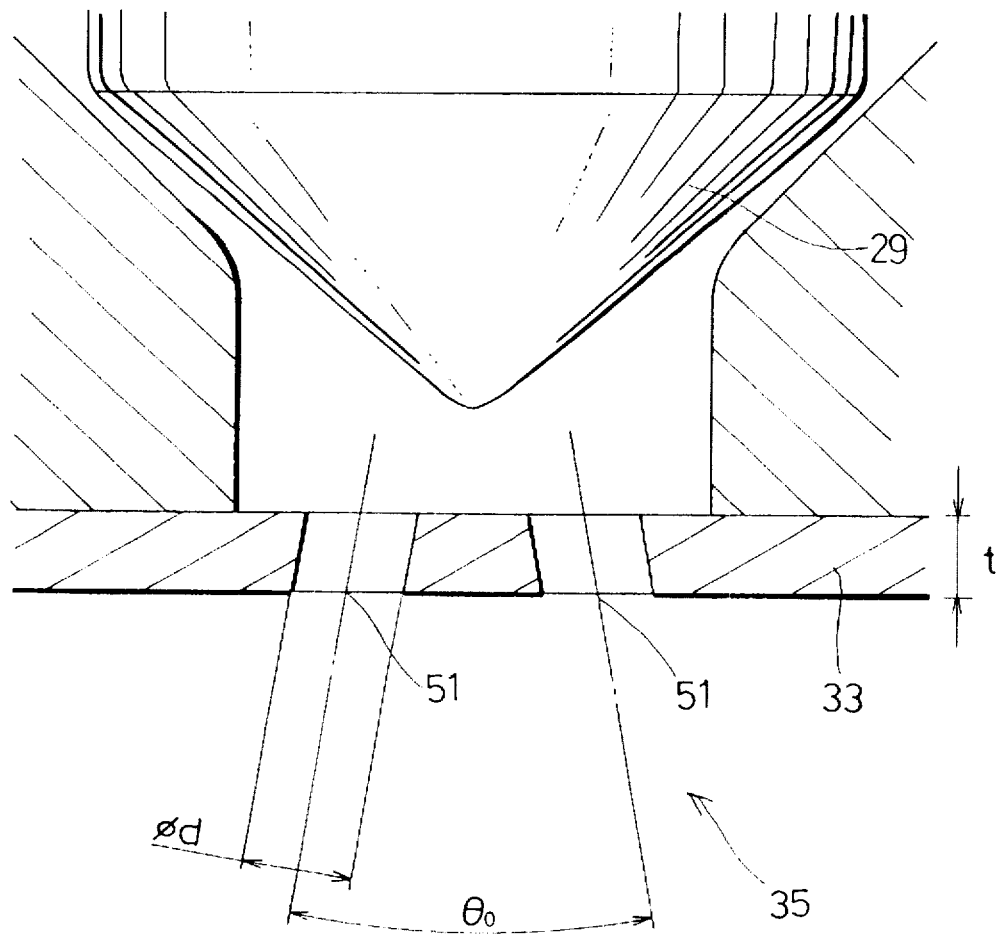
FIG. 5 is a view similar to FIG. 2 illustrating the peripheral construction of a fuel jet section of a conventional injector.
Figure 6:
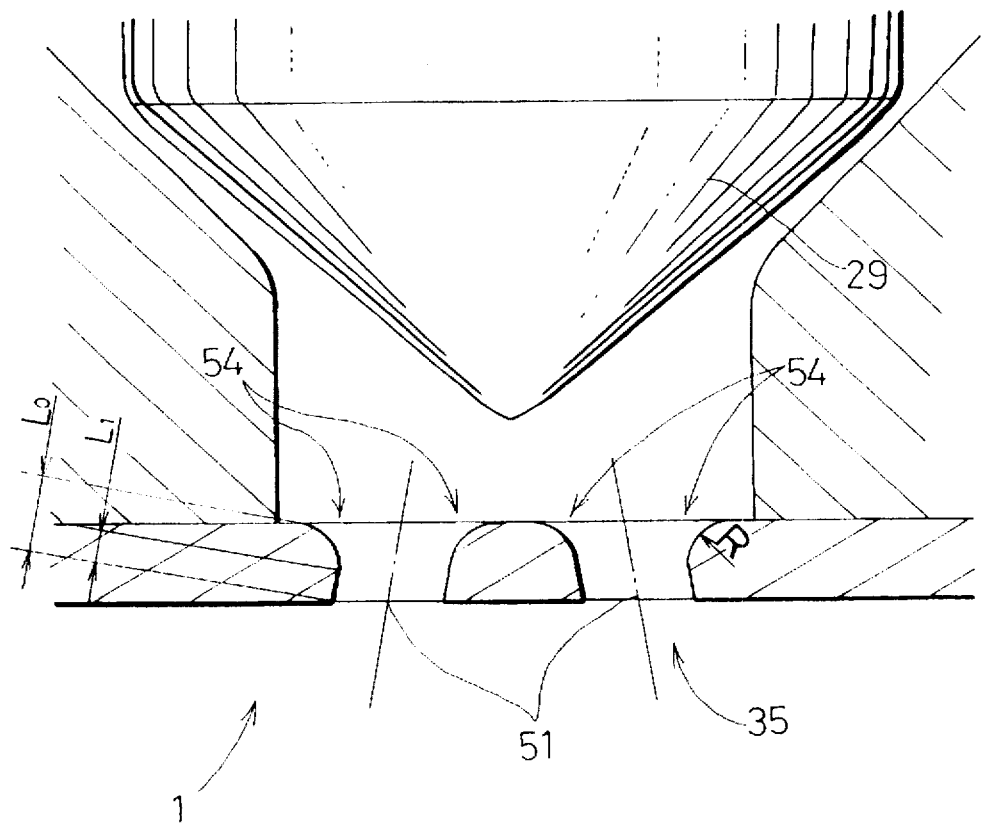
FIG. 6 is a view similar to FIG. 2 illustrating the peripheral construction of a fuel jet section of another conventional injector.
Figure 7:
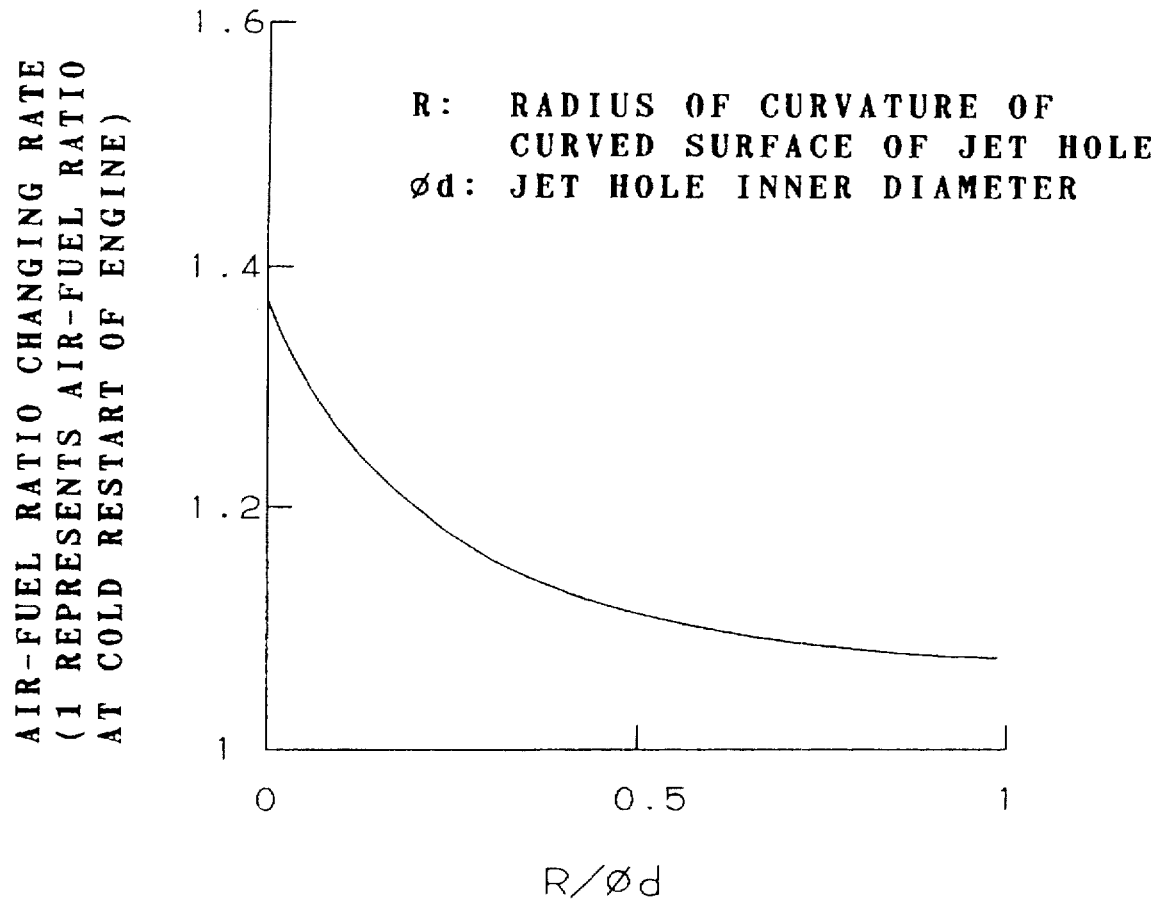
FIG. 7 is a graph illustrating the relation between the configuration of the jet hole and the air-fuel ratio changing rate.

Furthermore, the orifice plate 133 needs no structural change to apply to the different shapes of the valve head 129 shown by the modifications of the embodiment in FIGS. 3 and 4.

The orifice plate 133 of this embodiment described above is made by, for example, burring or one of press workings. Burring is a working technique to form a hole by press working at a starting hole prepared in advance on a work surface, and at the same time, to form a cylindrical projection (a flange shape) having the same inner diameter as that of the machining hole. This technique is known in the art, and its detailed description will be omitted.

Figure 11:
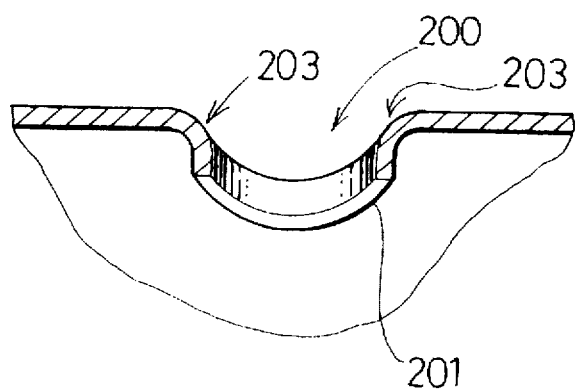
FIG. 11 is a perspective view illustrating a burring operation for manufacturing the orifice plate.

As shown in FIG. 11, by means of burring, a hole 200 is provided by press working, and a cylindrical projection 201 is formed at a press-punched end of the hole 200 while a circular round-surface 203 is formed at the opposite end thereof.

Preferably, the hole 200 may be the jet hole 151 of the orifice plate 133 shown in FIG. 2. Specifically, the round-surface 203 and the projection 201 are used, respectively, as the curved surface 154 and the projection 161 shown in FIG. 2. Thus, the orifice plate according to the present invention can be manufactured by burring or one of the low cost press workings.

What is claimed is:

1. A method of manufacturing an orifice plate to be mounted at a fuel jet section of an injector and having a plurality of jet holes extending therethrough from an inlet to an outlet for injecting fuel, said method comprising the steps of:

forming a plurality of starting holes in said orifice plate; and press working the plate material around the starting hole to form a curved surface at the inlet peripheral edge of each hole and a uniform cylindrical projection at the outlet of each hole to form said plurality of jet holes.

* * * * *